(12) United States Patent
Yamamoto

(10) Patent No.: US 6,948,674 B2
(45) Date of Patent: Sep. 27, 2005

(54) MAGNETIC TAPE CARTRIDGE

(75) Inventor: Hidetoshi Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 196 days.

(21) Appl. No.: 10/657,186

(22) Filed: Sep. 9, 2003

(65) Prior Publication Data

US 2004/0056133 A1 Mar. 25, 2004

(30) Foreign Application Priority Data

Sep. 19, 2002 (JP) ........................................ 2002-273216

(51) Int. Cl.[7] .............................................. G11B 23/07
(52) U.S. Cl. ...................... 242/348; 242/348.2; 360/132
(58) Field of Search ............................. 242/348, 348.2; 360/132

(56) References Cited

U.S. PATENT DOCUMENTS 6,742,738 B2 * 6/2004 Hiraguchi ................... 242/338

FOREIGN PATENT DOCUMENTS

JP 11-265560 A 9/1999

* cited by examiner

Primary Examiner—John Q. Nguyen
(74) Attorney, Agent, or Firm—Sughrue Mion, PLLC

(57) ABSTRACT

A tape cartridge is characterized by being provided with an opening to pull out a tape formed at a corner of a cartridge case; a curved door to open/close the opening; a slide mechanism to slide the door for the cartridge case; a door-side spring hooking portion formed at an end of said door; a case-side spring hooking portion formed on a bottom surface of the cartridge case; a coiled spring which is attached across the door-side spring hooking portion and case-side spring hooking portion, and energizes the door so as to close; and a regulation portion which is provided on one surface of the door, in which one end of a coiled spring is trial-fitted on a door-side spring hooking portion, and which is composed so as to regulate a position of the coiled spring when the coiled spring is pressed on one surface of the door.

20 Claims, 5 Drawing Sheets

MAGNETIC TAPE CARTRIDGE

FIELD OF THE INVENTION

The present invention relates to a magnetic tape cartridge with a curved door.

BACKGROUND OF THE INVENTION

Generally, as an external recording medium for a data backup of a computer and the like, there exists a magnetic tape cartridge in which a single reel winding a magnetic tape is housed (for example, see FIG. 2 in Japan paten laid open 11-265560).

There exist various kinds of the magnetic tape cartridges, and in recent years, one which forms an opening at a corner of a cartridge case to make a housing space of each device small in a magnetic tape drive and opens/closes the opening by a curved door has been developed. In these magnetic tape cartridges to open/close the curved door, an opening/closing structure is thought of by making the door a free-slidable structure for a case, protrusions such as pins being provided with the door and case, always energizing the door in a closing direction by hooking a tensile coiled spring inbetween these, and operating the protrusions formed on an outer surface from outside as needed. As a method to automate door assembling work in such the structure, after firstly setting the door in a guide groove formed in the case, one method is thought of to assemble a coiled spring of which both ends are pinched/held at the protrusions of the door and case by a robot hand.

However, in the above mentioned structure, if a firstly set door teeters, positions of the protrusions are displaced and the assembling work of the coiled spring becomes difficult, thereby the automation being worried to become difficult. Moreover, if a clearance between the protrusions of the door and case are small, it becomes difficult to insert the robot hand to attach an end of the coiled spring between them, thereby the automation thereof being also worried to become difficult. For such the problems, although an assembling method is thought of, with one end of the coiled spring being trial-fitted on the protrusion of the case, to pinch/hold it by the robot hand and to assemble the other end of the coiled spring in the protrusion of the case, the method is thought to have a tendency resulting in a assembling mistake because it is difficult to keep the coiled spring at a constant position due to its shape.

SUMMARY OF THE INVENTION

An exemplary object of the present invention is provide to a magnetic tape cartridge having a structure which can easily realize an automation of attaching work of a curved door to a case.

A magnetic tape cartridge of the invention solving the conventional problems is characterized in that: the cartridge is equipped with an opening to pull out a magnetic tape formed at a corner of a cartridge case, a curved door to open/close the opening, a sliding mechanism to slide the door for the cartridge case, a door-side spring hooking portion formed at an end of the door, a case-side spring hooking portion formed on a bottom surface of the cartridge case, and a coiled spring attached across the spring hooking portions at the door/case sides to energize the door to close; a regulation portion is provided at one surface of the door; and the regulation portion is composed so as to regulate a position of the spring when the coiled spring is pressed on the surface of the door performing a trial fitting of one end of the coiled spring on the door-side spring hooking portion.

According to the invention, if for example, by the robot hand, the curved door and coiled spring of which one end is attached to the door-side spring hooking portion are pinched/held together, the coiled spring is pressed to the regulation portion, thereby the position being regulated for the door. Then, the other end of the coiled spring fixed to the door is attached to the case-side spring hooking portion formed, for example, on the bottom surface of a lower half. Like this by the regulation portion regulating the position of the coiled spring for the door, it becomes easy to handle trial-fitting the coiled spring on the door.

DESCRIPTION OF THE PREFERRED EMBODIMENTS

Hereafter, referring to drawings, a magnetic tape cartridge will be described in detail.

Figure 1:
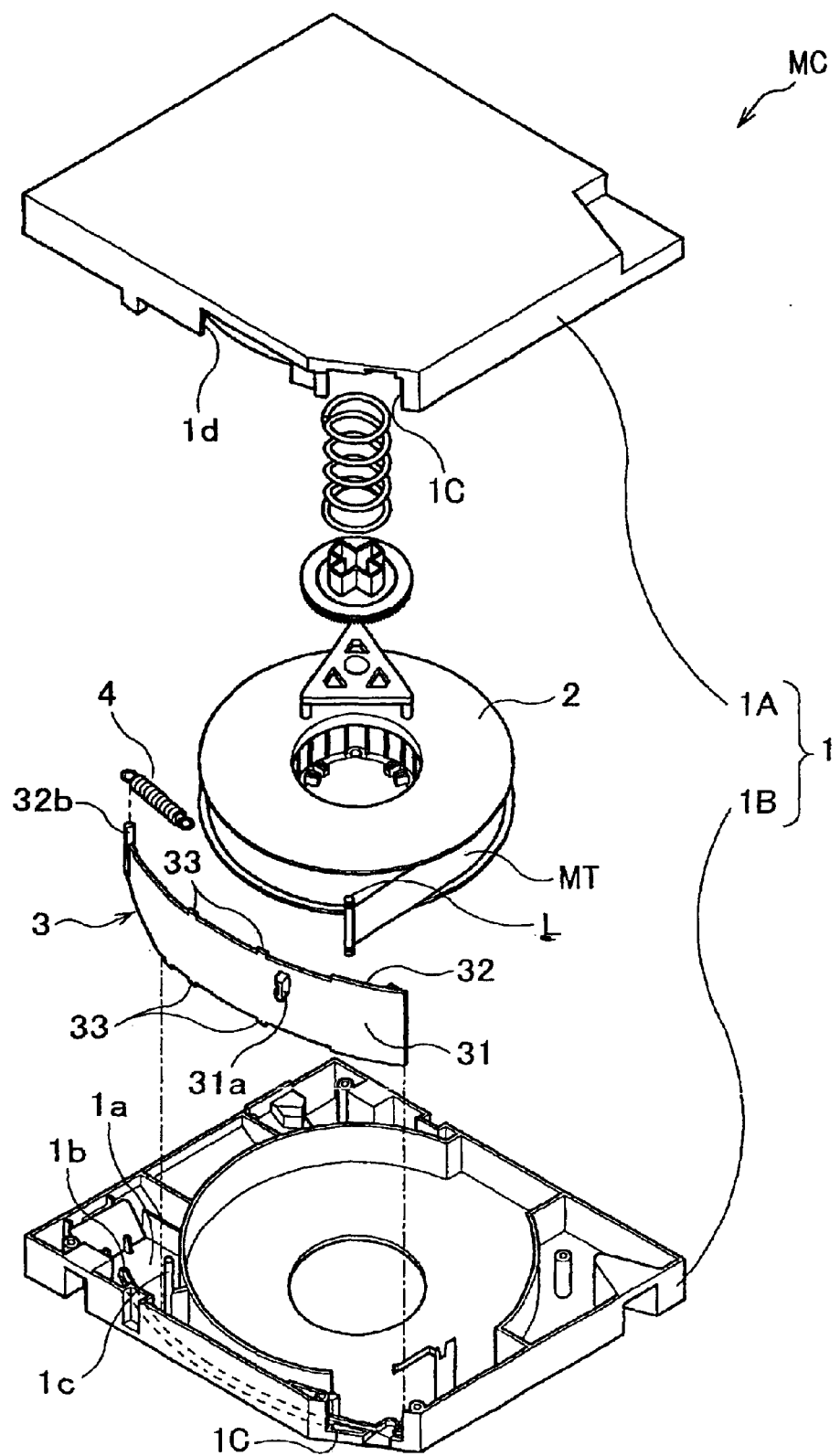
FIG. 1 is an exploded perspective view showing a totality of a magnetic tape cartridge related to the present invention.

As shown in FIG. 1, a magnetic tape cartridge MC is composed of a cartridge case 1 divided into an upper half A and lower half B in its appearance. Then, within the cartridge case 1, a reel 2 in which a magnetic tape is wound, a curved slide door 3, and a coiled spring 4 which always energizes the slide door 3 in a closing direction, are mainly provided.

The cartridge case is approximately rectangular in its plan view, its one corner is formed obliquely to be chamfered, and a magnetic tape pulling-out port 1 is formed cutting across the upper half A and lower half B. Moreover, in the cartridge case 1, a curved guide groove (slide mechanism) 1b in which the slide door 3 is free-slidably attached to a bottom surface 1a of the lower half 1B and a case-side spring hooking portion 1c which is a pin-form protrusion with the coiled spring 4 being attached are formed. In the upper half 1A like the lower half 1B, a guide groove and protrusion corresponding to the guide groove 1b and case-side spring hooking portion 1c, not shown in the drawing, are formed.

Figure 2:
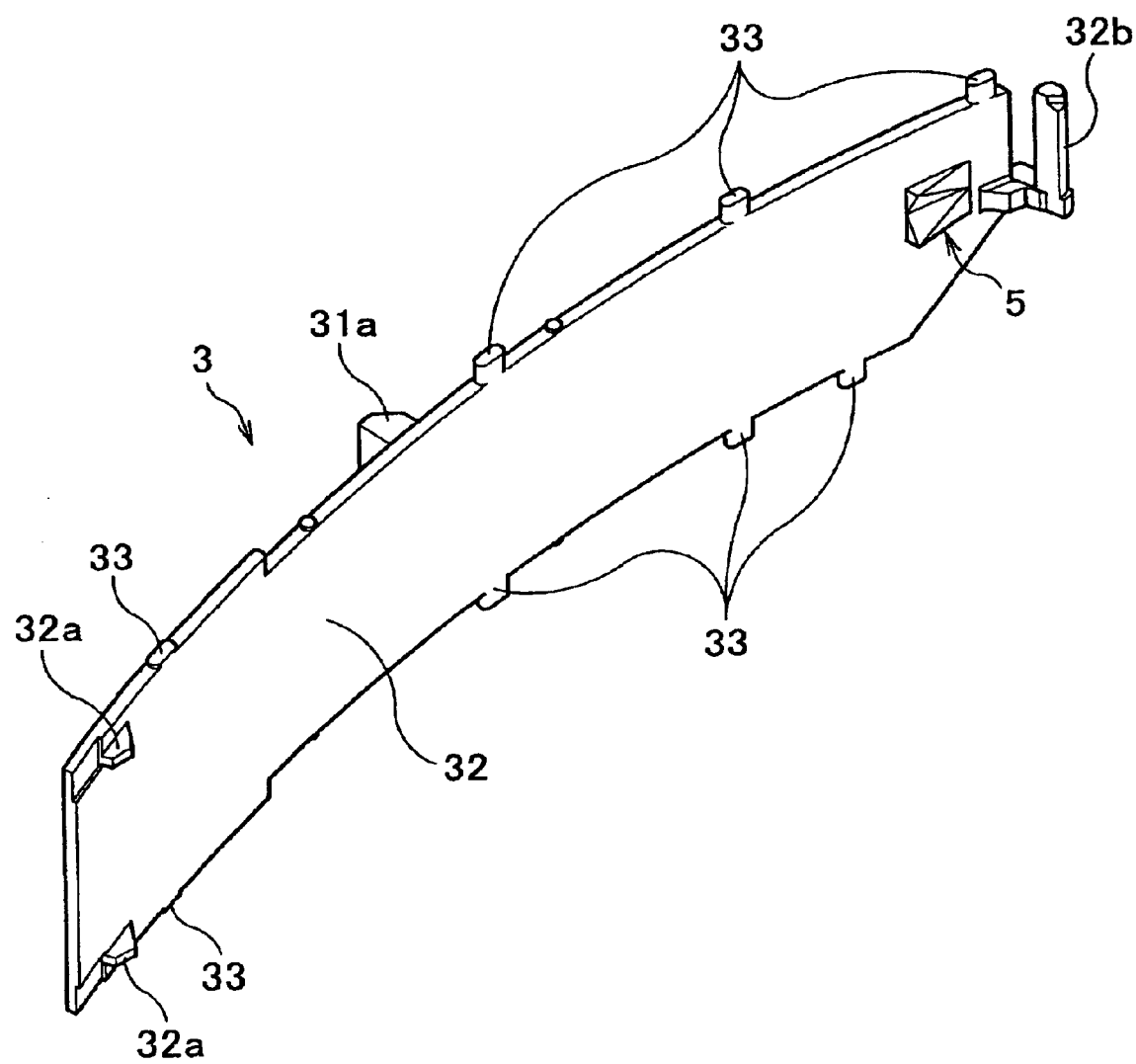
FIG. 2 is an enlarged perspective view showing an inner surface side of a slide door of FIG. 1.
Figure 3:
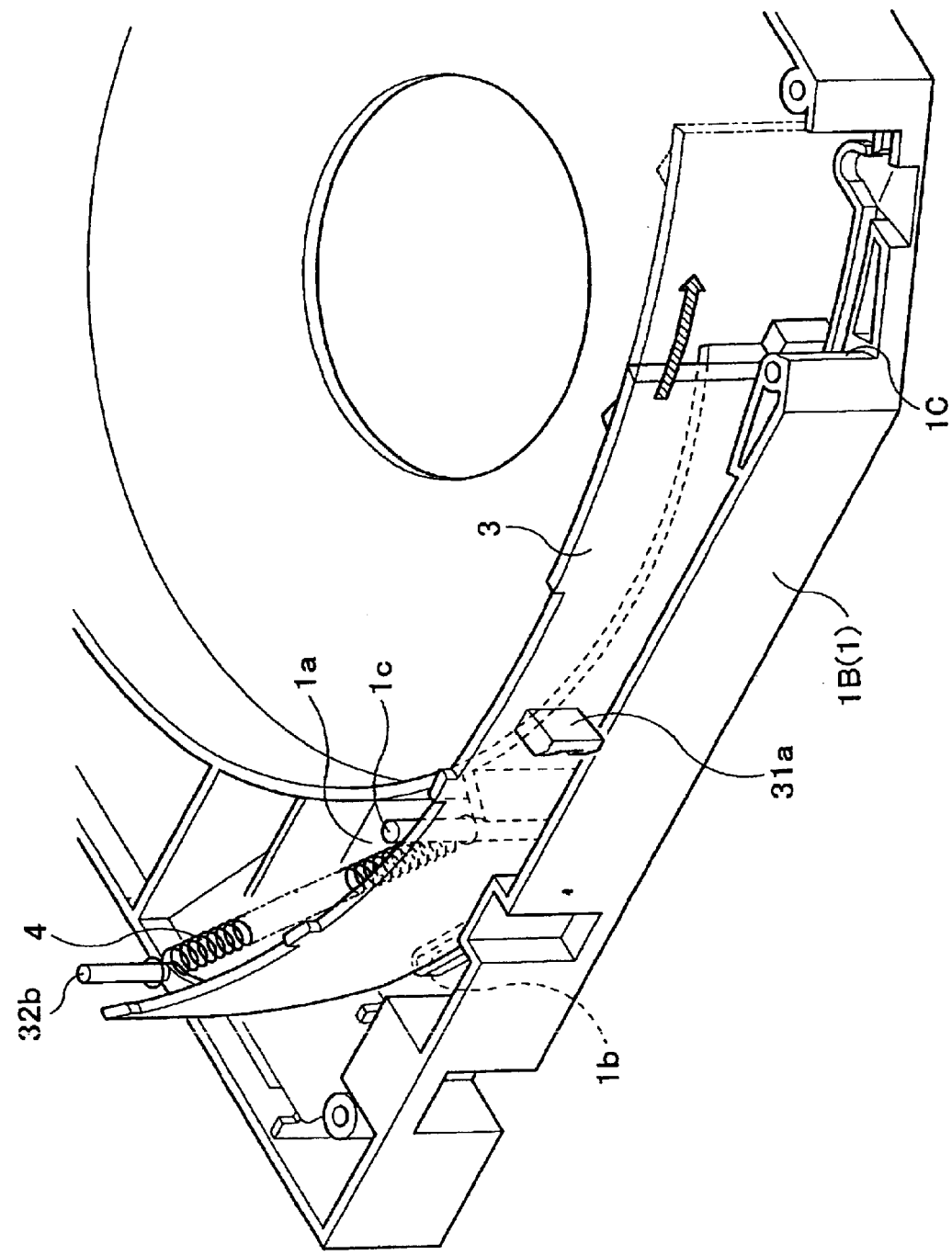
FIG. 3 is a main portion enlarged drawing showing a main portion of the magnetic cartridge tape of FIG. 1.

The slide door 3 in a state assembled within the cartridge case 1 is formed like a sheet convexly curved on its outer surface 31 and concavely curved on its inner surface. Moreover, in upper/lower end rims, slide-use protrusions (slide mechanism) 33 which free-slidably engage in the guide groove 1b of the upper/lower halves A and B are formed. On the outer surface, an operation-use protrusion piece 31a which exposes from an operation-use opening 1d formed in the cartridge case 1 (upper half 1A) in order to open/close the slide door 3 from outside. Then, as shown in FIG. 2, stoppers 32a to restrain a leader pin L (see FIG. 1) attached to a top end of the magnetic tape MT in a closed state of the slide door 3 are formed at a back end portion (end portion becoming a closing direction in assembling) of the inner surface 32, and a door-side spring hooking portion 32b which is a pin-form protrusion protruding upward is formed at a front end portion of the inner surface 32. Then, as shown in FIG. 3, the slide door 3 is always energized in the closing direction by the coiled spring 4 attached across the door-side spring hooking portion 32b of the door 3 and the case-side spring hooking portion 1c of lower half 1B, and is structured so as to open/close the magnetic tape pulling-out port 1C of the cartridge case 1 by being moved in an opening direction as needed by the operation-use protrusion piece 31a of the spring 4.

Figure 4:
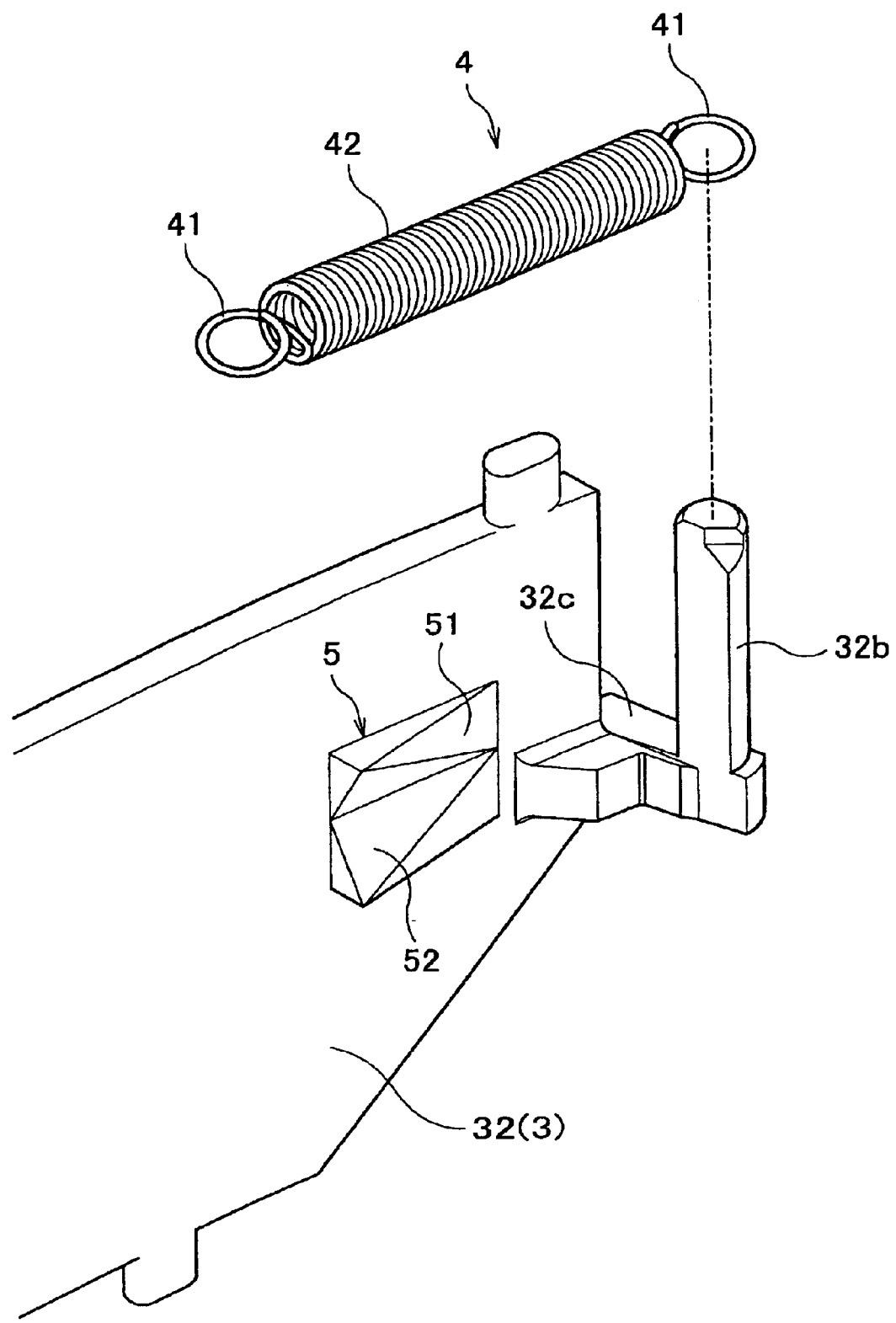
FIG. 4 is a main portion enlarged perspective view showing a front portion of the slide door of FIG. 2.

The coiled spring 4, as shown in FIG. 4, is a tensile coiled spring and is provided at its both ends with ring portions 41 approximately formed in a ring. Meanwhile, the ring portions 41 need not be completely formed in the ring, and any shape is available if it can hook the door side spring hooking portion 32b and case-side spring hooking portion 1c.

To be more precise, the door side spring hooking portion 32b is formed so as to protrude upward from a top end of an extending portion 32c extending toward inside from a front end portion of the slide door 3. Moreover, the hooking portion 32b of which diameter is cylindrically formed so as to be approximately as large as an inner diameter of the ring portions 41 formed at both ends of the coiled spring 4, and part of the hooking portion 32b is cut away along an axial direction. In addition, a top end portion of the hooking portion 32b is cut away along an axial direction and the cutaway portion is formed in such a taper which gradually increases in its diameter as it goes downward. The hooking portion 32b being formed like this, a maximum length of its top end portion becomes smaller than an inner diameter of the ring portion 41, so it easily enters in the top end portion. When attaching the ring portion 41 to a base end portion of the hooking portion 32b of which diameter becomes approximately same as that of the base end portion, the ring portion 41 is smoothly guided by the tapered portion as far as a portion of which diameter approximately becomes same as that of the portion 41. Then, the portion 41 is guided till the base end portion by the approximately same diameter portion and attached. Meanwhile, shapes of the door-side spring hooking portion 32b and case-side spring hooking portion 1c are not limited to a pin form like the embodiment, and any shapes of protrusions are available if they can hook both ends of the coiled spring 4

In the inner surface 32 of the slide door 3, a regulation portion 5 is formed adjacent to a vicinity of the extending portion 32c. The regulation portion 5 consists of a wedged main body 51 of which protrusion amount toward inside gradually becomes larger as it directs from the front end portion to back end portion of the slide door 3, and at an inner surface side of the main body 51, a V groove 52 with a cross section of approximately V letter of which width and depth gradually becomes larger as it goes from its front to back is formed. Then, the regulation portion 5 regulates up/down directions of the coiled spring 4 when the spring 4 in which one ring portion 41 is attached to the door-side spring hooking portion 32b is pressed to the V groove 52. Here, in forming the regulation portion 5, a protrusion amount to its inside is set to become an uncontactable amount with the coiled spring 4 which elongates/shrinks according to movements of the slide door 3 assembled within the cartridge case 1.

Next, an assembling method of the slide door 3 with the lower half 1B is described. Firstly, as shown in FIG. 4, provide the door 3 in which the ring portion 41 at one end of the coiled spring 4 is attached to the door-side spring hooking portion 32b on a transport pallet (not shown in the drawing) provided with other components and the upper/lower halves 1A and 1B at predetermined positions. Then, the spring 4 is supported by a jig not shown in the drawing so that a middle portion 42 of the spring 4 positions in a vicinity of the V groove 52 of the regulation portion 5. Meanwhile, the embodiment enables the spring 4 to be maintained in a vicinity of the regulation portion 5 without using such the jig because the diameter of the door-side spring hooking portion 32b is formed approximately same as the inner diameter of the ring portion 41.

Figure 5:
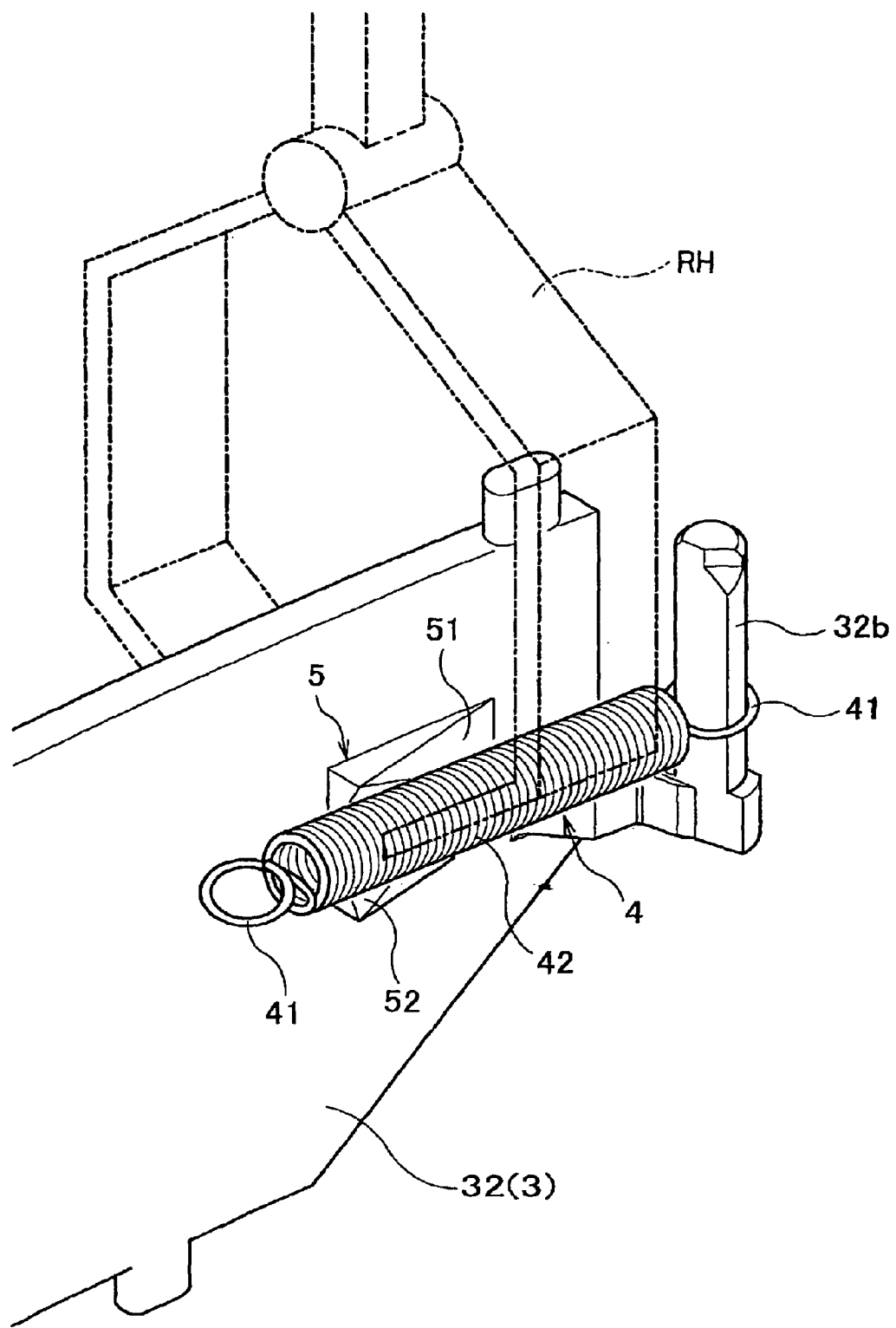
FIG. 5 is a main portion enlarged perspective view showing a state in which a coiled spring is assembled to the slide door.

When the transport pallet is transported to an assembling process of the slide door 3, make a robot hand RH pinch/hold front and back sides of the door 3 provided on the pallet as shown in FIG. 5. Then, the robot hand RH pinching/holding the front side of the door 3 also pinches/holds the door 3 and the middle portion 42 of the coiled spring 4. If a position of the spring 4 is displaced in some degree, the spring 4 pinched/held like this is guided to the center of V groove 52 of the regulation portion 5 by abutting surfaces of the groove 52 and results in its position being surely regulated for the door 3.

Then, attach the ring portion 41 at the other end of the spring 4 fixed to the door 3 as described above to the case-side spring hooking portion 1c formed on the bottom surface 1a of the lower half 1B (see FIG. 1). After that, by fitting the door 3 in the guide groove 1b of the lower half 1B with the robot hand RH, the assembling work terminates.

According to the above, the following effects can be obtained.

In the assembling of the slide door 3, because the coiled spring 4 is regulated in its position for the door 3 by the regulation portion 5, it can freely operate the robot hand RH so as not to contact a rib and the like formed in the lower half 1B. According to this, because the door 3 and spring 4 can be assembled together in the lower half 1B, it is not necessary to consider a problem occurring in a method attaching the spring 4 after setting the door 3 at first, thereby the assembling work of the door 3 being able to be easily automated. Moreover, because the spring 4 is regulated in its position for the door 3 by the regulation portion 5, the other ring portion 41 can be surely attached to the case-side spring hooking portion 1c of the lower half 1B by pinching/holding the door and coiled spring with the robot hand RH in an undisplaced state. Furthermore, because the middle portion 42 of the spring 4 is pinched/held with the robot hand RH, it can be inserted in a wider space at an opening direction than that of vicinity of the hooking portion 1c of the lower half 1B, thereby being able to prevent an interference with the rib enclosing the reel 2.

As described above, the present invention is not limited to the embodiment and practiced in various forms.

In the present embodiment, although a case to assemble the slide door 3 in the lower half 1B is described, the invention is not limited to this and anything is available if it regulates a position for the door 3 of the coiled spring 4. For example, something with a groove of an approximately U-letter cross section in stead of the V groove 51, two protrusions protruding inside from the inner surface 32 of the door 3 so as to pinch/hold the spring 4 in the up/down directions, and the like may be adopted as a regulation portion.

What is claimed is:

1. A tape cartridge comprising:
   an opening to pull out a tape formed at a corner of a cartridge case;
   a curved door to open/close the opening;
   a slide mechanism to slide the door for said cartridge case;
   a door-side spring hooking portion formed at an end portion of said door;
   a case-side spring hooking portion formed on a bottom surface of said cartridge case;

a coiled spring which is attached across said door-side spring hooking portion and said case-side spring hooking portion, and energizes said door so as to close; and a regulation portion which is provided on one surface of said door, in which one end of the coiled spring is trial-fitted on said door-side spring hooking portion, and said regulation portion is composed so as to regulate a position of the coiled spring when the coiled spring is pressed on said one surface of said door.

2. A tape cartridge according to claim 1, wherein said regulation portion is provided adjacent to said door-side spring hooking portion.

3. A tape cartridge according to claim 2, wherein said tape is a magnetic tape.

4. A tape cartridge according to claim 2, wherein said regulation portion consists of a protruded main body portion toward inside of the cartridge and a V groove with an approximately V-letter cross section formed in the main body portion.

5. A tape cartridge according to claim 4, wherein said regulation portion is set to be uncontactable with a coiled spring which elongates/diminishes according to movements of a slide mechanism assembled within said cartridge case.

6. A tape cartridge according to claim 5, wherein said regulation portion is a wedge of which a protrusion amount becomes larger from a front toward a back of said slide door, and wherein said V groove gradually becomes larger in width and depth from a front toward a back of said slide door.

7. A tape cartridge according to claim 4, wherein said regulation portion is a wedge of which a protrusion amount becomes larger from a front toward a back of said slide door, and wherein said V groove gradually becomes larger in width and depth from a front toward a back of said slide door.

8. A tape cartridge according to claim 2, wherein said regulation portion is set to be uncontactable with a coiled spring which elongates/diminishes according to movements of a slide mechanism assembled within said cartridge case.

9. A tape cartridge according to claim 8, wherein said regulation portion is a wedge of which a protrusion amount becomes larger from a front toward a back of said slide door, and wherein said V groove gradually becomes larger in width and depth from a front toward a back of said slide door.

10. A tape cartridge according to claim 2, wherein said tape is an optical recording tape.

11. A tape cartridge according to claim 1, wherein said regulation portion consists of a protruded main body portion and a V groove with an approximately V-letter cross section in an inner surface of said slide door.

12. A tape cartridge according to claim 11, wherein said regulation portion is set to be uncontactable with a coiled spring which elongates/diminishes according to movements of a slide mechanism assembled within said cartridge case.

13. A tape cartridge according to claim 12, wherein said regulation portion is a wedge of which a protrusion amount becomes larger from a front toward a back of said slide door, and wherein said V groove gradually becomes larger in width and depth from a front toward a back of said slide door.

14. A tape cartridge according to claim 11, wherein said regulation portion is a wedge of which a protrusion amount becomes larger from a front toward a back of said slide door, and wherein said V groove gradually becomes larger in width and depth from a front toward a back of said slide door.

15. A tape cartridge according to claim 11, wherein said tape is a magnetic tape.

16. A tape cartridge according to claim 11, wherein said tape is an optical recording tape.

17. A tape cartridge according to claim 1, wherein said tape is a magnetic tape.

18. A tape cartridge according to claim 1, wherein said tape is an optical recording tape.

19. A tape cartridge according to claim 1, wherein said regulation portion is set to be uncontactable with a coiled spring which elongates/diminishes according to movements of a slide mechanism assembled within said cartridge case.

20. A tape cartridge according to claim 19, wherein said regulation portion is a wedge of which a protrusion amount becomes larger from a front toward a back of said slide door, and wherein said V groove gradually becomes larger in width and depth from a front toward a back of said slide door.

* * * * *